(12) United States Patent
Croner

(10) Patent No.: US 8,386,481 B1
(45) Date of Patent: Feb. 26, 2013

(54) SYSTEM AND METHOD FOR CANDIDATE ASSESSMENT

(75) Inventor: Christopher Croner, Chicago, IL (US)

(73) Assignee: Salesdrive LLC, Oak Brook, IL (US)

( * ) Notice: Subject to any disclaimer, the term of this patent is extended or adjusted under 35 U.S.C. 154(b) by 338 days.

(21) Appl. No.: 11/871,889

(22) Filed: Oct. 12, 2007

(51) Int. Cl.
*G06F 17/30* (2006.01)
*G06Q 10/00* (2006.01)

(52) U.S. Cl. 707/732; 705/7.14; 705/7.42; 707/999.101

(58) Field of Classification Search ............. 705/1, 7.14, 705/7.36, 7.42; 707/1, 3, 6, 7, 10, 100, 101, 707/732–734, 780, 999.006, 999.101; 709/203, 709/228; 702/199
See application file for complete search history.

(56) References Cited

U.S. PATENT DOCUMENTS

| | | | |
|---|---|---|---|
| 7,502,748 B1 | 3/2009 | Baldwin et al. | |
| 7,606,778 B2 | 10/2009 | Dewar | |
| 7,945,522 B2 | 5/2011 | McGovern et al. | |
| 2002/0045154 A1 | 4/2002 | Wood et al. | |
| 2002/0111843 A1 | 8/2002 | Wellenstein | |
| 2004/0210661 A1* | 10/2004 | Thompson | 709/228 |
| 2005/0273350 A1 | 12/2005 | Scarborough et al. | |
| 2007/0150233 A1* | 6/2007 | Firehammer et al. | 702/180 |
| 2008/0033792 A1* | 2/2008 | Rosner et al. | 705/11 |
| 2009/0319344 A1* | 12/2009 | Tepper et al. | 705/11 |

OTHER PUBLICATIONS

Anna Brown and Dave Bartram "Relationships between OPQ and Enneagram Types" Research Report, Version 1.3, http://www.enneagraminstitute.com/articles/SHLresearch.pdf, Jun. 2005.*
2 OPQ32 Profile Report, SHL Group pic, OPQ32i (U.S. English)—Managerial and Professional 2001, 1 page.
Croner, Christopher et al., *Never Hire a Bad Salesperson Again*, 2006, 159 pages, The Richard Abrahan Compny, LLC, rabraham@richardabrahamcompany.com.
Bookmark: Facts About Drive in Salespeople, Interviewing Sales Candidates for Drive, Feb. 2007, 2 pages, www.salesdrive.info.
Office Action for U.S. Appl. No. 13/047,712, mail date May 22, 2012, 14 pages.
Office Action for U.S. Appl. No. 13/047,712, mail date Oct. 17, 2012, 15 pages.

* cited by examiner

*Primary Examiner* — Marc Filipczyk
(74) *Attorney, Agent, or Firm* — Foley & Lardner LLP

(57) ABSTRACT

A computer-implemented candidate assessment system is configured to identify the drive characteristics of a candidate having taken a personality test. The system includes a characteristic identification engine configured to identify at least a candidate achievement score, a candidate competitiveness score, and a candidate optimism score, a candidate assessment engine configured to determine a drive core skill score based on a combination of the candidate achievement score, candidate competitiveness score, and candidate optimism score. The drive score is determined with weighting using the achievement score. The system also includes a reporting engine configured to generate a profile report including the drive core skill score.

12 Claims, 7 Drawing Sheets

Profile Report

400

| Key | | | | |
|---|---|---|---|---|
| 1 – Poor Fit | 2 – Weak Fit | 3 – Average Fit | 4 - Good Fit | 5 - Excellent Fit |

| | Description | Fit |
|---|---|---|
| Drive (410) | Total level of Drive: Weighted combination of Need for Achievement, Competitiveness, and Optimism. (420) | 1 2 3 4 5 (430)<br>GREEN |

| Elements of Drive (425) | Description | Fit |
|---|---|---|
| Need for Achievement | Sets high personal goals. Is ambitious. Prepared to work long and hard in the pursuit of excellence and promotion. | 1 2 3 4 5<br>GREEN |
| Competitiveness | Needs to compete and win. Determined to be the top producer. Never says "die" once a challenge has been accepted. | 1 2 3 4 5<br>GREEN |
| Optimism | Expects to succeed. Remains resilient in the face of rejection. | 1 2 3 4 5<br>YELLOW |

| Other Core Skills (410) | Description (420) | Fit |
|---|---|---|
| Confidence | Is unfazed by rejection. Not easily offended. Will persist despite setbacks. Feels self-assured. Freely expresses opinions or concerns. | 1 2 3 4 5<br>GREEN |
| Persuasion | Builds a good case, taking customer needs into account. Closes compellingly. Enjoys selling and winning people over to their point of view. Stays calm under pressure. | 1 2 3 4 5<br>GREEN |
| Relationship | Easily establishes and maintains relationships with prospects and customers. Likes to be around people. Comfortable at social events. | 1 2 3 4 5<br>GREEN |
| Organization | Is disciplined and methodical. Focuses on detail. Works to keep paperwork in order. Checks thoroughly to avoid mistakes. Tracks opportunities and contacts. Task-oriented. Follows up. | 1 2 3 4 5<br>YELLOW |

| Sales Roles (440) | Description | Fit |
|---|---|---|
| Hunter | Develops leads and new business opportunities. Closes new accounts. | 1 2 3 4 5<br>GREEN |
| Farmer | Develops and resells existing opportunities. Follows up diligently. Grows business steadily. | 1 2 3 4 5<br>YELLOW |

| Testing Consistency (450) | The candidate responded consistently across the questionnaire, showing appropriate motivation and understanding of the items. |
|---|---|

FIG. 4

Core Skill Test Scale Rationale

500 →

| Core Skill | OPQ Scales | Reason |
|---|---|---|
| Drive | Achieving (FE9) | W&A r=.26 (.43 noCBRE) |
| | Competitive (FE8) | SHL r=.12; Krishnan, 2003 |
| | Optimistic (FE4) | SHL r=.19 |
| | If STEN FE9<=3 and Drive Fit>1, then Drive Fit=1 | |
| | If STEN FE9=4 and Drive Fit>2, then Drive Fit=2 | |
| | If STEN FE9=5 and Drive Fit>3, then Drive Fit=3 | |
| | If STEN FE9=6 and Drive Fit>3, then Drive Fit=3 | |
| Confidence | Optimistic (FE4) | W&A r=.23; SHL r=.19 |
| | -Modesty (RP8) | W&A r=-.24 |
| | Tough-minded (FE3) | SHL r=.15 |
| | -Conventional (TS4) | W&A r=-.23 |
| Persuasion | Persuasive (RP1) | W&A restriction of range (high) |
| | Controlling (RP2) | W&A OF r=.19; SHL r=.19 |
| | -Worrying (FE2) | W&A r=-.23 |
| | Optimistic (FE4) | W&A r=.19 |
| | -Emotionally Controlled (FE6) | W&A r=-.24 |
| Organization | Detail Conscious (TS10) | W&A r=.22 |
| | Achieving (FE9) | W&A r=.21 |
| | -Variety Seeking (TS7) | W&A r=-.22 |
| Relationship | Optimistic (FE4) | W&A r=.26 (noCBRE) |
| | -Emotionally Controlled (FE6) | W&A r=-.20; SPX r=-.48 |
| | Affiliative (RP6) | Sevy recommendation |
| | Socially Confident (RP7) | Sevy recommendation |
| Hunter | Drive | |
| | Confidence | |
| | Persuasion | |
| Farmer | Relationship | |
| | Organization | |

*These are the OPQ-32i scales that go into each core skill score.

510 →

Algorithms

| Core Skill | Algorithm |
|---|---|
| Drive | FE9+FE8+FE4/3 |
| Confidence | FE4+FE3+(11-RP8)+(11-TS4)/4 |
| Persuasion | RP1+RP2+(11-FE2)+(11-FE6)+FE4/5 |
| Organization | TS10+FE9+(11-TS7)/3 |
| Relationship | FE4+RP6+RP7+(11-FE6)/4 |
| Hunter | Drive+Confidence+Persuasion/3 |
| | If Drive=1 and Hunt Fit>1, then Hunt Fit=1 |
| | If Drive=2 and Hunt Fit>2, then Hunt Fit=2 |
| | If Drive=3 and Hunt Fit>3, then Hunt Fit=3 |
| Farmer | Organization+Relationship/2 |

FIG. 5

DriveTest Scale Rationale

Fit Bars

Core Skills Fit 1-5 bar 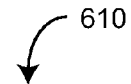

D – Drive: These are the rules for calculating the Drive score as it appears in the DriveTest report. "D" refers to the score that is obtained after applying the algorithm for Drive in FIG. 5.

| Rules | FIT (1=5 bar) | Bar Color |
|---|---|---|
| Primary Rules | | |
| If D <= 2 | 1 | Red |
| If D > 2 and D <= 4 | 2 | Red |
| If D > 4 and D <= 6 | 3 | Yellow |
| If D > 6 and D <= 8 | 4 | Green |
| If D > 8 | 5 | Green |
| Secondary Rules | | |
| If STEN FE9 = 6 and FIT > 3 | 3 | Yellow |
| If STEN FE9 = 5 and FIT > 3 | 3 | Yellow |
| If STEN FE9 = 4 and FIT > 2 | 2 | Red |
| If STEN FE9 <= 3 and FIT > 1 | 1 | Red |

Need for Achievement, Competitiveness, Optimism: These are the rules for calculating the Fit score for the three (3) elements of Drive listed in FIG. 5. They may be calculated based on the test taker's OPQ-32 scores for Achieving, Competitive, and Optimistic, respectively. These scores range from 1 to 10.

| Rules | FIT (1=5 bar) | Bar Color |
|---|---|---|
| If OPQ Score = 1 or 2 | 1 | Red |
| If OPQ SCORE = 3 or 4 | 2 | Red |
| If OPQ SCORE = 5 or 6 | 3 | Yellow |
| If OPQ SCORE = 7 or 8 | 4 | Green |
| If OPQ SCORE = 9 or 10 | 5 | Green |

Core Skill Test Scale Rationale

C – Confidence; P – Persuasion; R – Relationship; O – Organization: These are the rules for calculating every other Core Skill Score

| Rules | FIT (1=5 bar) | Bar Color |
|---|---|---|
| If Score <= 2 | 1 | Red |
| If SCORE > 2 and SCORE <= 4 | 2 | Red |
| If SCORE > 4 and SCORE <= 6 | 3 | Yellow |
| If SCORE > 6 and SCORE <= 8 | 4 | Green |
| If SCORE > 8 | 5 | Green |

720

Hun - Hunter

| Rules | FIT (1=5 bar) | Bar Color |
|---|---|---|
| Primary Rules | | |
| If Hun <= 2 | 1 | Red |
| If Hun > 2 and Hun <= 4 | 2 | Red |
| If Hun > 4 and Hun <= 6 | 3 | Yellow |
| If Hun > 6 and Hun <= 8 | 4 | Green |
| If Hun > 8 | 5 | Green |
| Secondary Rules | | |
| If Drive = 3 and FIT > 3 | 3 | Yellow |
| If Drive = 2 and FIT > 2 | 2 | Red |
| If Drive = 1 and FIT > 1 | 1 | Red |

Farm - Farmer

| Rules | FIT (1=5 bar) | Bar Color |
|---|---|---|
| Rules | | |
| If Farm <= 2 | 1 | Red |
| If Farm > 2 and Farm <= 4 | 2 | Red |
| If Farm > 4 and Farm <= 6 | 3 | Yellow |
| If Farm > 6 and Farm <= 8 | 4 | Green |
| If Farm > 8 | 5 | Green |

FIG. 7    730

SYSTEM AND METHOD FOR CANDIDATE ASSESSMENT

BACKGROUND

The present disclosure relates generally to the field of employment and/or aptitude assessment. More particularly, the present disclosure relates to a system and method for candidate assessment by identifying drive characteristics of an candidate.

Highly skilled sales representatives are an important part of many businesses. However, identifying job candidates and/or current employees that will become highly skilled sales representatives is a difficult task. Sales managers often specifically request a person that is driven, but they are unable to define what that means or how these characteristics can be recognized.

Personality tests are often administered to candidates to attempt to identify candidates having the necessary characteristics to become high performing salespeople. However, these personality tests do not always recognize and/or properly account for those characteristics that are indicative of a person that is likely to become a high performing salesperson.

Accordingly, there exists a need for a system and method for candidate assessment by identifying drive characteristics of an candidate. What is further needed is such a system and method configured to utilize an existing personality test.

SUMMARY

One embodiment relates to a computer-implemented candidate assessment system configured to identify the drive characteristics of a candidate having taken a personality test. The system includes a characteristic identification engine configured to identify at least a candidate achievement score, a candidate competitiveness score, and a candidate optimism score, a candidate assessment engine configured to determine a drive core skill score based on a combination of the candidate achievement score, candidate competitiveness score, and candidate optimism score. The drive score is determined with weighting using the achievement score. The system also includes a reporting engine configured to generate a profile report including the drive core skill score.

Another embodiment relates to a computer implemented method to determine drive characteristics of an individual. The method includes receiving results of a personality test, identifying at least a candidate achievement score, a candidate competitiveness score, and a candidate optimism score, and determining a drive core skill score based on a weighted combination of the candidate achievement score, candidate competitiveness score, and candidate optimism score. The method further includes generating a profile report including the drive core skill score.

Yet another embodiment relates to a computer-implemented candidate assessment system configured to identify a plurality of core skills for a candidate having taken a personality test. The system includes a characteristic identification engine configured to identify at least a candidate achievement score, a candidate competitiveness score, and a candidate optimism score, a candidate modesty score, a candidate tough-mindedness score, a candidate conventional score, a candidate persuasive score, a candidate controlling score, a candidate worrying score, a candidate emotionally controlled score, a candidate affiliative score, a candidate social confidence score, a candidate detail consciousness score, and a candidate variety seeking score. The system further includes a candidate assessment engine configured to determine a drive core skill score, a confidence core skill score, a persuasion core skill score, a relationship core skill score, and an organization core skill score based on the identified candidate scores. The system yet further includes a reporting engine configured to generate a profile report including the determined core skill score.

BRIEF DESCRIPTION OF THE DRAWINGS

FIG. 4 is a profile report illustrating the drive characteristic of a candidate created using the system of FIG. 1, according to an exemplary embodiment;

FIG. 5 is a table illustrating drive test scale rationale and associated algorithms for evaluating candidates in the system of FIG. 1, according to an exemplary embodiment;

FIG. 6 is a table illustrating how the drive test scale rationale of FIG. 5 relates to the fit bars of the profile report of FIG. 4, according to an exemplary embodiment; and FIG. 7 is a table illustrating how the drive test scale rationale of FIG. 5 relates to the fit bars and sales roles of the profile report of FIG. 4, according to an exemplary embodiment.

DETAILED DESCRIPTION OF THE PREFERRED EMBODIMENTS

Figure 1:
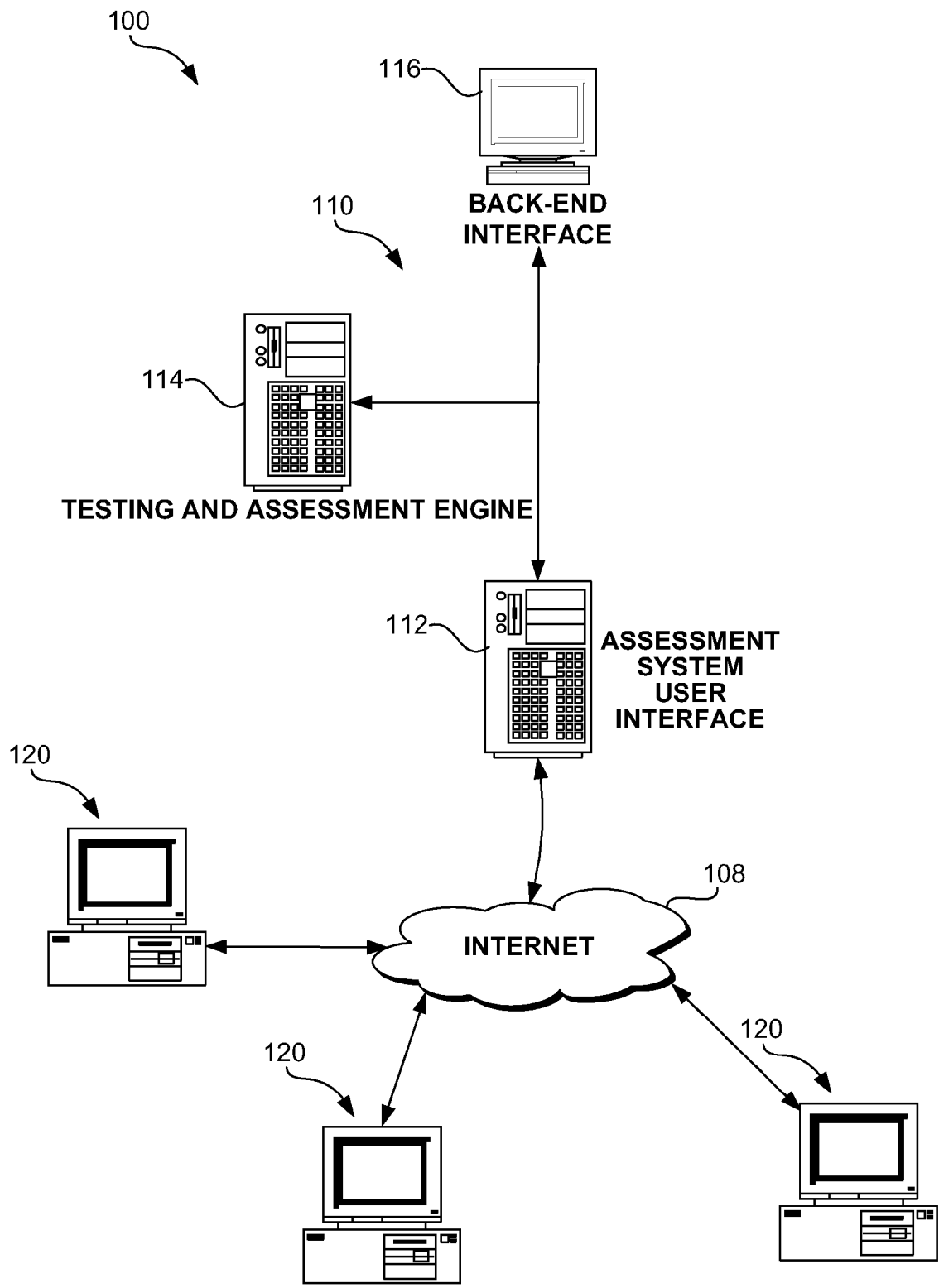
FIG. 1 is a system for implementing a candidate assessment system and method configured to identify drive characteristics of an individual, according to an exemplary embodiment.

Referring now to FIG. 1, a system 100 for implementing a candidate assessment system and method configured to identify drive characteristics is shown, according to an exemplary embodiment. System 100 includes a candidate assessment system 110 and one or more user computing system 120 used by candidates to access the candidate assessment system. The candidate assessment system 110 may be implemented on one or more host computers and may be accessible to the computer system 120 by way of a network, such as the Internet 108. Although system 100 is shown as including specific systems arranged according to a specific configuration, it should be understood that system 100 may include more, fewer, and/or a different configuration of systems to perform the functions described herein.

The candidate assessment system 110 includes a candidate testing and assessment engine 114, an assessment system user interface 112, and a back end interface 116. Engine 114, user interface 112, and back-end interface 116 in candidate assessment system 110 may be implemented using separate computing systems (e.g., separate servers) as shown or may be implemented as processes on a single computing system. Further, each engine or interface may alternatively be implemented using multiple, distributed systems and may include security protection corresponding to the sensitivity associated with each.

Assessment system user interface 112 is a computing system configured to provide a front-end interface to users desiring to use the functions of system 110, such as testing functions, assessment functions, report generation functions, report access functions, etc. as described herein. According to an exemplary embodiment, user interface 112 is configured to implement a plurality of web-based interfaces configured to allow users to access and utilize these functions. User interface 112 may also be configured to implement supportive functionality related to these transactions such as security functions, system help functions, searching functions, etc.

Candidate assessment engine 114 is a computing system configured to implement a candidate assessment function. Candidate assessment includes identifying drive characteristics in a candidate based upon the candidate's answers to a personality test. The personality test may be a specially created test or an existing personality test chosen to gather answers and data that have been identified as being characteristic of drive, as described in further detail below.

Back end interface 116 is a computing system configured to allow an implementer of system 110 to perform maintenance and implementation functions. Maintenance and implementation functions may be implemented using computer code configured to affect the operation of system 110. Exemplary functions may include performing database maintenance, performing computer code updates, implementing changes to the interfaces of interface 112, implementing financial functions, such as billings for services, etc.

Computing systems 120 are standard computing systems configurable to enable candidate assessment system users to access functions offered through system 110, receive messages through system 110, etc. In exemplary embodiments, the computing systems 120 may comprise personal computers, portable handheld devices (e.g., cellular telephones, PDA devices, portable e-mail devices), and other types of devices enabling users to view, edit, or otherwise access the information contained in the assessment system 110. Some embodiments may include other systems in addition to or in place of the computing systems 120 to allow the user to interact with the assessment system 110.

Figure 2:
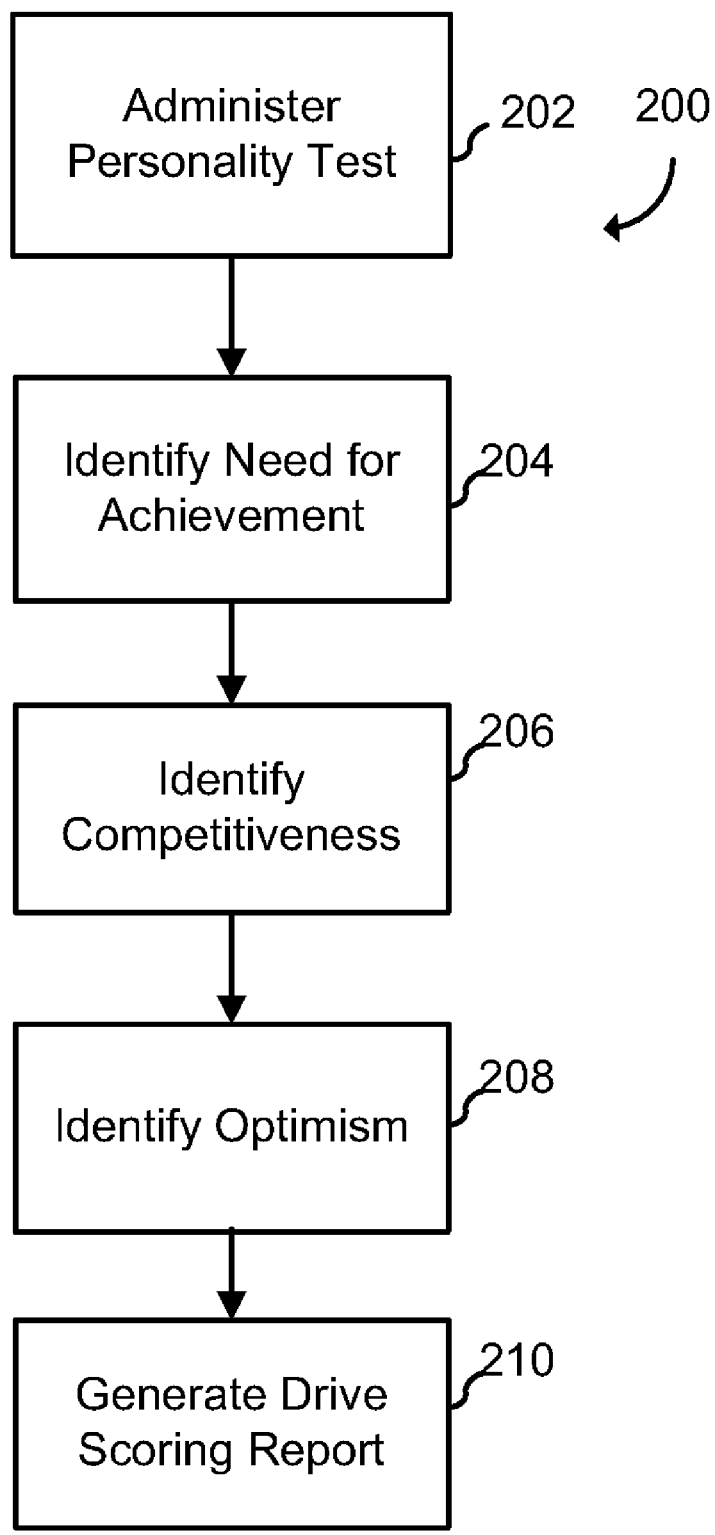
FIG. 2 is a flowchart illustrating a method for identifying drive characteristics using the system of FIG. 1, according to an exemplary embodiment.

Referring now to FIG. 2, a flowchart 200 illustrating a method for identifying drive characteristics using system 110 is shown, according to an exemplary embodiment. Additional, fewer, or different operations may be performed depending on the embodiment. System 110 may be configured such that registration is required before the full functionality of system 110 can be accessed. Registration may consist of providing minimal information such as name, email address, and a password.

In an operation step 202, a personality test is administered to the candidate. The personality test may be an on line test administered using system 100, described above in detail with reference to FIG. 1. One such test is the Occupational Personality Questionnaire (OPQ32, OPQ32n, OPQ32i, etc.) psychometric tool provided by the SHL Group, Inc. of Manchester, England. Although this specific test (e.g., OPQ32i) is identified and used as an example herein, one of ordinary skill in the art should understand that system 100 may be implemented using one or more other tests that facilitate identification of drive characteristics. Other exemplary tests may include: The Profile's Sales Indicator, The Sales Achievement Predictor, The Devine Inventory/SelectBest, The Caliper Test, The Predictive Index, HR Chally Sales Test. The Hogan Sales Test, The Express Screen Test from the Objective Management Group, the Service Relations Profile, etc.

According to an exemplary embodiment, the personality test may be configured to include forced choice format questions. Each question in this format requires the candidate to consider multiple statements and to choose the statement that they consider "most" like them, and the statement they consider "least" like them. Sample questions may require the candidate to make their choice among statements such as "I enjoy talking to new people," "I rarely keep things tidy," "I like to help others," and "I worry about deadlines." Advantageously, this format of personality test has been shown to be less susceptible to faking than other formats. Alternatively, a non-ipsative type can be utilized.

In an operation 204, a level of need for achievement is identified for the candidate. The need for achievement is strong in a person that needs to do well simply for the sake of doing well. Need for achievement is the ambition that leads a salesperson to relentlessly strive for excellence in their performance. People high in need for achievement want to do well for the personal satisfaction achievement brings. This intense motivation pushes people to set tough but achievable goals, to find innovative solutions, and to take personal responsibility for their level of performance. For example, a goal driven person who is constantly seeking recognition for their achievements would have a high need for achievement.

In an operation 206, a level of competitiveness is identified for the candidate. A candidate having strong competitiveness is constantly comparing themselves to their co-workers' levels to gauge their progress and drive their work habits. Competitiveness is the desire to win and to outperform others. Competitive salespeople monitor their performance constantly to make sure they are surpassing their peers. They work hard to prepare for a task to make sure that they outperform others. For example, a salesperson having a strong competitiveness would feel a strong need to win a customer over to their point of view.

In an operation 208, a level of optimism in the candidate is identified. The level of optimism is an expectation in the candidate that they will succeed and also is strongly indicative of their resiliency in the face of adversity. Optimistic candidates interpret rejection as something temporary, unusual, and outside of their control.

In an operation 210, a drive characteristics report is generated. Drive characteristics can be determined based on a combination of the need for achievement, competitiveness and level of optimism identified in step 204-208. Preferably, the need for achievement is weighted in some fashion. Weighting can be achieved by use of an overriding algorithm, scaling, a filter, a multiplication factor, etc. The combination may be determined using an algorithm applied to the three personality traits that will provide a measure of drive characteristics. Generating the report may include applying a scoring filter to properly weight the characteristics received in operations 204-208. Scores may be further translated from an absolute score into a number between 1 and 5. For example, one translation of an exemplary OPQ32 score may be as follows Score>=8.5, then overall score=5
Score>=6.5, then overall score=4
Score>=4.5, then overall score=3
Score>=2.5, then overall score=2
Score<2.5, then overall score=1

Although drive characteristics in particular are identified herein, it should be understood by one of ordinary skill in the art that the system and method described herein may be applied to determine one or more additional core skill characteristics. Examples may include confidence, persuasiveness, organization skills, relationship skills. Confidence characteristics are likely to identify a person that is unfazed by rejection, will persist despite setbacks, is self assured and is not easily offended. Persuasive characteristics identify a person that is likely to be articulate, able to formulate a compelling argument, takes customer needs into account and closes sales compellingly. Organization skill characteristics identify a person that is likely to be disciplined, track opportunities and contacts, follow up diligently and be able to juggle multiple tasks. Relationship skill characteristics identify a person that is likely to be able to easily establish and maintain a trusting relationship with both prospects and customers.

System 110 and method 200 may also be used to identify a primary sales role, the primary sales role being a selection between at least a hunter role associated with a person that is likely to develop leads and new business opportunities that secures new accounts, is fearless and expects to win and a farmer role associated with a person that is likely to develop and resell to existing opportunities, follow up diligently and steadily grow business.

Figure 3:
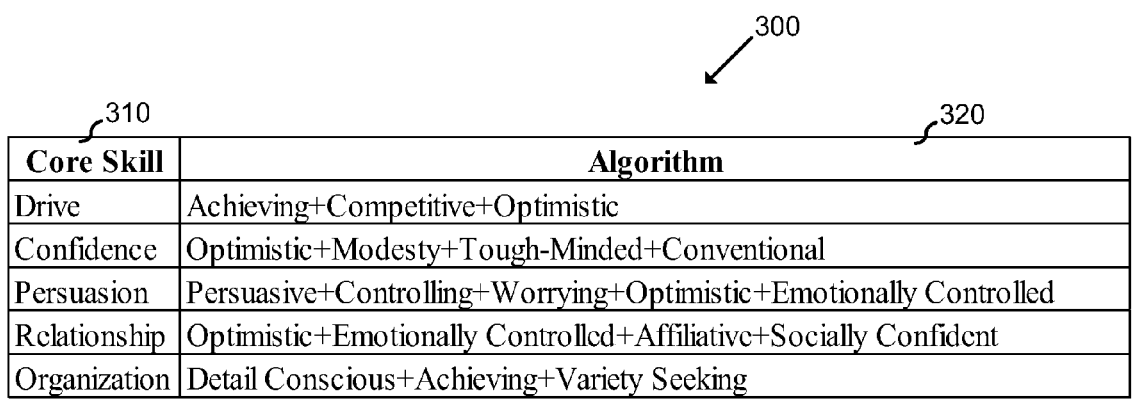
FIG. 3 is a table identifying personality characteristics of core skills including the drive characteristic using the method of FIG. 2, according to an exemplary embodiment.

Referring now to FIG. 3, a table 300 identifying personality characteristics of core skills including the drive characteristic using the method of FIG. 2 is shown, according to an exemplary embodiment. The table may be used to identify characteristics from standard OPQ32 scale scores and their importance in determining the core skills. The standard OPQ32 scale scores include scores for each of the characteristics in the table of FIG. 3.

The relative weight of each of the characteristics in determining the core skill may be determined by applying a scoring filter or algorithm to the scale scores. The scoring filter may be created by analyzing empirical data representing OPQ scores of established and high achievement salespeople in manufacturing and financial services positions. Using this information, the characteristics from standard OPQ32 scale scores that are most important in determining the level of the core skill and also their relative importance to that core skill can be identified.

The scoring filter or algorithm may further include special decision rules to account for anomalies, such as special situations where an underachiever may receive an inappropriately high score, using thresholds or minimum standards. For example, low scorer on an OPQ Achievement Scale may automatically receive a low score on drive, independent of their actual score. To provide another example, multiple decision rules may apply to a single core skill. For example, in determining the drive core skill, if achieving is less than or equal to a "3" and the drive score is greater than "1", then the drive score is set to equal "1", while if achieving is equal to a "4" and the drive score is greater than "2", then the drive score is set to equal "2".

Table 300 includes a listing of five exemplary core skills in a listing 310 including drive, confidence, persuasion, relationship and organization. Each entry in listing 310 is correlated to a plurality of standard OPQ32 scale scores in a listing 320 that have been determined through empirical testing to be indicative of the core skill. In the simplest instance, to arrive at a score for each of the core skills, the respective OPQ scale scores may be added, and the sum divided by the total number of scales in the algorithm.

A similar table may be used to identify a sales role that is most compatible with the skills of the candidate. The sales role may be determined using standard OPQ32 scale scores and/or the above identified core skills in a manner similar to how the core skills are determined. For example, a hunter role may be identified based on an algorithm that utilizes the drive core skill, confidence core skill, and persuasiveness core skill. A farmer role may be identified based on an algorithm that utilizes the relationship core skill and organization core skill.

Oral or written interview questions may be used to probe candidate skills supplemental to or instead of OPQ test scores. For example, a drive core skill may be probed by asking questions or making comments such as: How would your manager rank your competitiveness compared to peers? Why? When was the last time you were competitive? Tell me about your last success at work. What is the biggest effort you ever made to succeed at work? Tell me about the worst customer problem you ever faced. How did you recover? Tell me about a time when your persistence won a sale. Another time? When critiquing the interview answers, a professional may specifically look for certain qualities to each answer, for example: Has a manager ranked them as most competitive? Has a recent example (e.g., work, home, or sports) been given? Does the candidate have a strong need for accomplishment? Is there a willingness to sacrifice as much as necessary to win? Regarding optimism, can the candidate come back strong after tough times? Is there a history of substantial efforts to secure a new customer? An interviewer can utilize the drive report to choose questions that focus on particular characteristics.

In another example, a confidence core skill may be probed by asking questions or making comments such as: When was the last time a customer got under your skin? What gets you through a day full of rejections? When was the last time you held your ground with a difficult customer? When is your confidence strongest? Weakest? Tell me about your cold calling experience. When critiquing the interview answers, a professional may specifically look for certain qualities to each answer, for example: Does the candidate rarely get upset by customers? Can the candidate persist all day and see opportunity in every call? Is the candidate unafraid to speak their mind when necessary? Does the candidate have a limited number of weak areas? Does the candidate have substantial experience and a relaxed approach?

In another example, a persuasion core skill may be probed by asking questions or making comments such as: What is your most effective method of closing a sale? Tell me about the best case you have ever made for a customer to buy from you. Talk about the most stubborn prospect you have ever turned into a customer. How did you finally do it? Tell me about a time when you persuaded a difficult customer to your way of thinking When did you last run across someone who couldn't be sold? What did you try? When critiquing the interview answers, a professional may specifically look for certain qualities to each answer, for example: Does the candidate tailor his or her approach to the customer and personally bond? Does the candidate provide an airtight case tailored to customer's buying style? Does the candidate convince with patience, persistence, and a strong close? Does the candidate possess patience and tact while tailoring to a customer's buying style? Does the candidate possess creativity and persistence?

In another example, a relationship core skill may be probed by asking questions or making comments such as: How do you move customers from prospects to long-term relationships? How do you bond with difficult customers? How do you keep long-term customers? What has challenged you most in establishing a customer relationship? Talk about your most frustrated or disappointed customer recently. When critiquing the interview answers, a professional may specifically look for certain qualities to each answer, for example: Does the candidate bond closely with customers in little time? Does the candidate use patience and find things in common with the customers? Does the candidate hold regular meetings, visits, and consistently add value to the customer relationship? Have past delays be unrelated to the candidate's behavior? Have past disappointments been unrelated to salesperson's behavior?

In another example, a relationship core skill may be probed by asking questions or making comments such as: How do your organizational skills compare with coworkers? Tell me about a time when your organization skills were noticed by a manager. How do you avoid getting overwhelmed with daily hassles? What techniques work? How did you get ready for your most recent sales call? When critiquing the interview answers, a professional may specifically look for certain qualities to each answer, for example: Does the candidate have stronger organization skills than average? Is the candidate recognized by a manager for organization? Does the candidate uses a day planner, laptop, notebooks, etc.? Does the candidate prepare thoroughly and study the company?

Referring now to FIG. 4, a profile report 400 reporting the drive characteristic of a candidate created using system 110 is shown, according to an exemplary embodiment. Profile report 400 may include a core skill listing 410, a skill description 420, a core skill elements listing 425, a skill score or fit listing 430, a sales role section 440, and a testing consistency section 450. Although an exemplary profile report is shown and described, it should be easily understood that the profile report may include different sections, different manners of reporting, etc. to achieve the functions described herein.

Core skill listing 410 may include a listing of the core skills (e.g., drive, confidence, persuasion, relationship, organization, etc.), that were measured and calculated in generating profile report 400 and described in detail above with reference to FIG. 3. Skill description section 420 may include a description for each of the core skills in listing 410 to provide the candidate reviewer with more detailed information regarding that core skill. One or more core skills 410 may include one more core skill elements 425 and a description of that element. For example, a drive core skill may include the elements of need for achievement, competitiveness, and optimism.

Skill score section 430 may include the calculated core skill score that was determined as described above with reference to FIGS. 2 and 3. According to one exemplary embodiment, the calculated core skill may be illustrated as a colored bar. In such an embodiment, a shorter bar that corresponds with a lower number may indicate a worse fit while longer bar with a higher number may indicate a better fit. Similarly, in such an embodiment the color coding of the fit bar may be as follows:

Green: The candidate may show potential to perform well in most sales positions. This potential should be verified with reference checks and interviews.

Yellow: The candidate may have one or more aspects of their personality that could compromise sales performance. Low-fit areas should be probed with reference checks and interviews.

Red: The candidate is likely to perform below standards in most sales positions.

Sales role section 440 may include scores indicative of the candidate's scores for each of the sales roles (e.g., a hunter, a farmer, etc.) as described above.

Testing consistency section 450 may include an indication of whether the candidate responded consistently across the questionnaire, showing appropriate motivation and understanding of the items. A candidate may receive an inconsistent rating, for example, where they provided answers consistent with high organization skills in a first part of the personality test and answers consistent with low organization skills in a second part of the personality test. This inconsistency may indicate a lack of understanding or that the candidate was providing answers to attempt to achieve a particular scoring rather than being truthful.

Referring to FIG. 5, a table 500 illustrates and characterizes core skill 410 test scale rationale based on core skill elements 425 according to one exemplary embodiment. In one example, a drive skill fit may be based on the score of each drive skill element (e.g., achieving, competitive, optimistic, etc.) by averaging the score of each element. The drive skill fit may be modified to a lower score if any skill element is at or below a threshold level. For example, if a candidate's achieving score (e.g., as extracted from an OPQ32 test) is four, even though the averaged drive fit may be greater than two, the drive fit may be adjusted to a value of two. A table 510 illustrates and characterizes algorithms for evaluating core skills 410 of candidates (e.g., averaging the elements of a drive skill), according to various exemplary embodiment.

Referring to FIG. 6, tables 610 and 620 illustrates rules for how the drive core skill test scale rationale of FIG. 5 relates to the fit bars of the profile report of FIG. 4, according to an exemplary embodiment. Table 610 specifically describes exemplary primary and secondary rules for calculating the drive fit based on the drive score obtained after applying the algorithm of FIG. 5. For example, if a drive score is below two, the fit may be given a score of one and a color coding of red. If the drive score is three or four, the fit may be given a score of two and a color coding of red. If the drive score is five or six, the fit may be given a score of three and a color coding of yellow. If the drive score is seven or eight, the fit may be given a score of four and a color coding of green. If the drive score is greater than eight (e.g., on a scale of 1-10), the fit may be given a score of five and a color coding of green.

The secondary rules may modify the fit based on low scores in a specific element. For example, if an achieving element has a score of five or six, a green fit of four or five may be reduced to a yellow fit of three. If an achieving element has a score of four or less, a green or yellow fit of three to five may be reduced to a red fit of one or two.

Table 620 specifically describes exemplary rules for calculating a fit score for the elements of a drive skill based on a candidate's OPQ test scores. For example, an OPQ score of one or two of an element may correspond to a red fit score of one, an OPQ score of three or four to a red fit of two, an OPQ score of five or six to a yellow fit of three, an OPQ score of seven or eight to a green fit of four, and an OPQ score of nine or ten to a green fit of five.

Referring to FIG. 7, tables 710, 720, and 730 illustrate how the core skill test scale rationale of FIG. 5 relates to the fit bars and sales roles of the profile report of FIG. 4, according to an exemplary embodiment. With similar logic to that of table 610, table 710 describes exemplary primary and secondary rules for calculating any core skill 410 fit based on the core skill score obtained after applying the algorithm of FIG. 5.

Table 720 specifically describes exemplary primary and secondary rules for calculating the fit of a candidate to a hunter sales role. For example, if a hunter score is below two, the fit may be given a score of one and a color coding of red. If the hunter score is three or four, the fit may be given a score of two and a color coding of red. If the hunter score is five or six, the fit may be given a score of three and a color coding of yellow. If the hunter score is seven or eight, the fit may be given a score of four and a color coding of green. If the hunter score is greater than eight (e.g., on a scale of 1-10), the fit may be given a score of five and a color coding of green.

The secondary rules may modify the hunter sales role fit based on low scores in a specific core skill. For example, if a drive skill has a score of three, a green fit of four or five may be reduced to a yellow fit of three. If a drive skill has a score of two, a green or yellow fit of three to five may be reduced to a red fit of two. If a drive skill has a score of one, a green, yellow, or red fit of two to five may be reduced to a red fit of one.

Table 730 specifically describes exemplary primary and secondary rules for calculating the fit of a candidate to a farmer sales role. For example, if a farmer score is below two, the fit may be given a score of one and a color coding of red. If the farmer score is three or four, the fit may be given a score of two and a color coding of red. If the farmer score is five or six, the fit may be given a score of three and a color coding of yellow. If the farmer score is seven or eight, the fit may be given a score of four and a color coding of green. If the farmer score is greater than eight (e.g., on a scale of 1-10), the fit may be given a score of five and a color coding of green.

Those skilled in the art will also appreciate that the sample screens discussed above may be structured in different manners, with information added or removed, with information displayed on more screens or fewer screens, and with the interaction between various screens implemented in different manners. The data structures supporting the screens may also be structured in a different manner and contain more or less information than depicted.

It should be noted that although flow charts may be provided herein to show a specific order of method steps, it is understood that the order of these steps may differ from what is depicted. Also, two or more steps may be performed concurrently or with partial concurrence. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps, and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machine to perform a certain function or group of functions.

The foregoing description of embodiments has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented candidate assessment system configured to identify the drive characteristics of a candidate having taken a personality test, comprising:
   at least one computer system for implementing:
   a characteristic identification engine including an electronic processor and configured to receive from a standard OPQ32 scale at least a candidate achievement score represented by a value FE9, a candidate competitiveness score represented by a value FE8, and a candidate optimism score represented by a value FE4, the candidate achievement score being an indication of a need of the candidate to do well for the sake of doing well and being generated in response to answers provided on the personality test, the candidate competitiveness score being an indication of a desire of the candidate to win and outperform others and being generated in response to the answers, the candidate optimism score being an indication of the expectation of the candidate to succeed and being generated in response to the answers, the personality test being an occupational personality questionnaire 32 standard (OPQ 32) psychometric tool, the occupational personality questionnaire 32 standard (OPQ 32) psychometric tool providing the candidate achievement score, the candidate optimism score, and the candidate competiveness score;
   a candidate assessment engine configured to determine a drive core skill score, wherein the drive skill score is equal to a value DRIVEFIT, wherein the value DRIVEFIT equals ((FE9+FE8+FE4)/3) scaled to a value between 1 and 5, unless:
   if ((FE9+FE8+FE4)/3) scaled to a value between 1 and 5 is more than 1 and FE9 is less than or equal to 3, then the value DRIVEFIT equals 1;
   if FE9 is equal to 4 and ((FE9+FE8+FE4)/3) scaled to a value between 1 and 5 is more than 2, then the value DRIVEFIT equals 2; and
   if ((FE9+FE8+FE4)/3) scaled to a value between 1 and 5 is more than 3 and FE9 equals 5 or 6, then the value DRIVEFIT equals 3;
   and
   a reporting engine configured to generate a profile report including the drive core skill score, wherein the value DRIVEFIT being 4 or 5 indicates a suitability to a sales role, wherein the value DRIVEFIT being 4 indicates a good fit for the sales role and the value of DRIVEFIT being 5 indicates an excellent fit for the sales role.

2. The candidate assessment system of claim 1, wherein the reporting engine is further configured to provide a bar indicator having a length corresponding to the value DRIVEFIT.

3. The candidate assessment system of claim 2, wherein a suitability for a farmer sales role and a hunter sales role is provided, wherein the suitability for the hunter sales role is based upon a hunter score based upon the drive core skill score, a confidence score, and a persuasiveness score, and the suitability for the farmer sales role is based upon a farmer score based upon a relationship score, and an organization score, wherein the confidence score is an indication of a willingness to persist despite setbacks and is calculated as $((FE4+FE3+(11-RP8)+(11-TS4))/4)$, where FE3 is a value for a tough-minded score provided by the Occupational Personality Questionnaire (OPQ) psychometric tool, where RP8 is a value for a modesty score provided by the Occupational Personality Questionnaire (OPQ) psychometric tool, where TS4 is a value for a conventional score provided by the Occupational Personality Questionnaire (OPQ) psychometric tool, wherein the persuasiveness score is an indication of an ability to build a good case and is calculated as $((RP1+RP2+(11-FE2)+(11-FE6)+FE4)/5)$ where RP1 is a value for a persuasion score provided by the Occupational Personality Questionnaire (OPQ) psychometric tool, where RP2 is a value for a controlling score provided by the Occupational Personality Questionnaire (OPQ) psychometric tool, where FE2 is a value for a worrying score provided by the Occupational Personality Questionnaire (OPQ) psychometric tool, where FE6 is a value for an emotionally controlled score provided by the Occupational Personality Questionnaire (OPQ) psychometric tool, and wherein the organization score is an indication of an ability to focus in details and is calculated as $((TS10+FE9+(11-TS7))/3)$, where TS10 is a value for a detail conscious score provided by the Occupational Personality Questionnaire (OPQ) psychometric tool, where TS7 is a value for a variety seeking score provided by the Occupational Personality Questionnaire (OPQ) psychometric tool, and wherein the relationship score is an indication of an ability to establish and maintain a trusting relationship and is calculated as $((FE4+RP6+RP7+(11-FE6))/4)$ where RP6 is a value for an affiliative score provided by the Occupational Personality Questionnaire (OPQ) psychometric tool, where RP7 is a value for a socially confident score provided by the Occupational Personality Questionnaire (OPQ) psychometric tool.

4. The candidate assessment system of claim 3, wherein the farmer score is provided by the reporting engine and the hunter score is provided by the reporting engine.

5. The candidate assessment system of claim 4, wherein the hunter score is equal to average of the drive score, the confidence score and the persuasiveness score scaled to a value between 1 and 5 and limited by the drive score and the farmer score is equal to the average of the organization score and the relationship score scaled to a value between 1 and 5.

6. The candidate assessment system of claim 1, wherein the profile report further includes a consistency score.

7. A computer implemented method to determine drive characteristics of a candidate, the method comprising:
receiving from a standard OPQ32 scale results of a personality test including at least a candidate achievement score, a candidate competitiveness score, and a candidate optimism score in a computer system, the personality test being an occupational personality questionnaire 32 standard (OPQ 32) psychometric tool providing the candidate achievement score, the candidate optimism score, and the candidate competiveness score, the candidate achievement score being a numeric value FE9 indicative of a need of the candidate to do well for the sake of doing well, the candidate competitiveness score being a numeric value FE8 indicative of a desire of the candidate to win and outperform others, and the candidate optimism score being a numeric value FE4 indicative of the expectation of the candidate to succeed;
determining using an electronic processor a drive core skill score, wherein the drive skill score is equal to a value DRIVEFIT, wherein the value DRIVEFIT equals $((FE9+FE8+FE4)/3)$ scaled to a value between 1 and 5, unless:
if $((FE9+FE8+FE4)/3)$ scaled to a value between 1 and 5 is more than 1 and FE9 is less than or equal to 3, then the value DRIVEFIT equals 1;
if FE9 is equal to 4 and $((FE9+FE8+FE4)/3)$ scaled to a value between 1 and 5 is more than 2, then the value DRIVEFIT equals 2; and
if $((FE9+FE8+FE4)/3)$ scaled to a value between 1 and 5 is more than 3 and FE9 equals 5 or 6, then the value DRIVEFIT equals 3, the drive core skill score being a numeric value indicative of suitability for a sales role; and
generating a profile report including the drive core skill score, wherein the value DRIVEFIT being 4 indicates a good fit for the sales role and the value of DRIVEFIT being 5 indicates an excellent fit for the sales role.

8. The method of claim 7, further including providing a score indicative of a preferred sales role.

9. The method of claim 8, wherein the preferred sales role is one of a farmer and a hunter sales role.

10. The method of claim 7, wherein the profile report further includes a consistency score.

11. The method of claim 7, wherein the personality test includes a plurality of forced choice format questions.

12. The method of claim 7, wherein the profile report includes a bar graph indicating the drive skill score.

* * * * *